(12) United States Patent
Park et al.

(10) Patent No.: US 8,398,953 B2
(45) Date of Patent: Mar. 19, 2013

(54) METHOD OF PREPARING LITHIUM TITANATE NANOPARTICLES

(75) Inventors: Yun Jung Park, Daejeon (KR); Dong Gyu Chang, Daejeon (KR); Chun Joong Kim, Seoul (KR); Ji Ho Park, Daejeon (KR); Woo Young Yang, Daejeon (KR)

(73) Assignee: Samsung Fine Chemicals Co., Ltd. (KR)

( * ) Notice: Subject to any disclaimer, the term of this patent is extended or adjusted under 35 U.S.C. 154(b) by 0 days.

(21) Appl. No.: 13/389,502

(22) PCT Filed: Aug. 9, 2010

(86) PCT No.: PCT/KR2010/005193
§ 371 (c)(1),
(2), (4) Date: Feb. 8, 2012

(87) PCT Pub. No.: WO2011/019171
PCT Pub. Date: Feb. 17, 2011

(65) Prior Publication Data
US 2012/0141360 A1    Jun. 7, 2012

(30) Foreign Application Priority Data
Aug. 11, 2009   (KR) .................. 10-2009-0073999

(51) Int. Cl.
*C01G 23/00*    (2006.01)

(52) U.S. Cl. .......... 423/598; 977/775; 977/776
(58) Field of Classification Search ......... 423/598; 977/775, 776
See application file for complete search history.

(56) References Cited

U.S. PATENT DOCUMENTS

| 6,827,921 B1 * | 12/2004 | Singhal et al. ............... 423/598 |
| 2003/0017104 A1 | 1/2003 | Spitler et al. |
| 2004/0217335 A1 * | 11/2004 | Sterzel ......................... 252/500 |
| 2006/0078727 A1 * | 4/2006 | Sabacky et al. ............... 428/328 |

FOREIGN PATENT DOCUMENTS

| JP | 09-309726 | 12/1997 |
| JP | 09-309727 | * 12/1997 |
| JP | 2005-239461 | 9/2005 |
| KR | 10-2008-0023831 | 3/2008 |

OTHER PUBLICATIONS

Machine Translation of Japan 09-309727, Dec. 2, 1997.*
International Search Report—PCT/KR2010/005193 dated Mar. 30, 2011.
Written Opinion—PCT/KR2010/005193 dated Mar. 30, 2011.

* cited by examiner

*Primary Examiner* — Steven Bos
(74) *Attorney, Agent, or Firm* — Cantor Colburn LLP

(57) ABSTRACT

A method of preparing lithium titanate nanoparticles, the method including: feeding reactants including lithium and titanium into a reactor, followed by mixing the reactants in the reactor at a molecular level; and generating a crystal nucleus by chemically reacting the reactants in the reactor.

15 Claims, 11 Drawing Sheets

METHOD OF PREPARING LITHIUM TITANATE NANOPARTICLES

TECHNICAL FIELD

The present invention relates to a method of preparing lithium titanate nanoparticles, and in particular, to a method of preparing lithium titanate nanoparticles, wherein the method includes: feeding reactants including lithium and titanium into a reactor, followed by mixing the reactants in the reactor at a molecular level; and generating a crystal nucleus by chemically reacting the reactants in the reactor.

BACKGROUND ART

Lithium titanate ($Li_4Ti_5O_{12}$, hereinafter referred to as LTO) is expected to be used as an anode active material for a lithium secondary battery.

As a method of preparing LTO, for example, a solid phase method and a sol-gel method are used.

In a solid phase method, solid-phase reactants are mixed and heated to prepare LTO. However, due to the high heating temperature, it is difficult to obtain uniform nanoparticles. Also, to manufacture such uniform nanoparticles, micro-particle powder reactants are required. Accordingly, a dependency on reactants is high and thus economic efficiency reduces.

In a sol-gel method, a metal alkoxide is transformed into a sol state and then gelled through condensation reaction, followed by drying and heating to prepare LTO. However, reactants used in this method are expensive and also, this method is based on an organic solvent. Accordingly, manufacturing costs are high and thus commercialization of this method has not been realized.

DETAILED DESCRIPTION OF THE INVENTION

Technical Problem

The present invention provides a method of preparing lithium titanate nanoparticles, wherein the method includes: feeding reactants including lithium and titanium into a reactor, followed by mixing the reactants in the reactor at a molecular level; and generating a crystal nucleus by chemically reacting the reactants in the reactor.

Technical Solution

According to an aspect of the present invention, there is provided a method of preparing lithium titanate nanoparticles, wherein the method includes: feeding reactants comprising lithium and titanium into a reactor, followed by mixing the reactants in the reactor at a molecular level; and generating a crystal nucleus by chemically reacting the reactants in the reactor.

The chemical reaction may be an acid-base reaction.

The reactants may be fed in at least one form of a solution form and a suspension form into the reactor.

The reactants may include an acidic raw material and a basic raw material, wherein the acidic raw material is fed into the reactor through a first raw material feeding line and the basic raw material is fed into the reactor through a second raw material feeding line.

The acidic raw material may include lithium and titanium, and the basic raw material may include metal hydroxide.

The acidic raw material may include titanium, and the basic raw material may include lithium.

The acidic raw material may include lithium, and the basic raw material may include titanium.

The basic raw material may include lithium and titanium, and the acidic raw material may include at least one selected from the group consisting of inorganic acids and organic acids.

A time ($T_M$) for the mixing at the molecular level is shorter than a time ($T_N$) for the generating the crystal nucleus.

$T_M$ may be in a range of 10 to 100 μs and $T_N$ may be 1 ms or less.

An inner temperature of the reactor may be maintained in a range of 0 to 90° C.

A molar ratio of lithium to titanium (Li/Ti) among the reactants may be in a range of 0.8 to 1.0.

A retention time of the reactants in the reactor may be in a range of 1 ms to 10 s.

The reactor may be a high gravity rotating packed bed reactor that includes: a chamber that defines an inner space; a permeable packed bed that is rotatable, is disposed inside the chamber, and is filled with a porous filler; at least one raw material feeding line through which the reactants are fed into the inner space; and a slurry outlet through which a slurry is discharged from the inner space.

A centrifugal acceleration of the permeable packed bed may be in a range of 10 to 100,000 m/s².

A $Li_2TiO_3$ peak may not be substantially present in an X-ray diffraction pattern.

Advantageous Effects

An embodiment of the present invention provides a lithium titanate nanoparticles preparation method that, due to the inclusion of feeding reactants including lithium and titanium into a reactor, followed by mixing the reactants in the reactor at a molecular level; and generating a crystal nucleus by chemically reacting the reactants in the reactor, enables low-cost preparation of high-purity nanoparticles which have a uniform particle size distribution and do not substantially have a $Li_2TiO_3$ peak at 2θ of 43 to 44 corresponding to a (133) plane in an X-ray diffraction pattern.

BEST MODE

Figure 1:
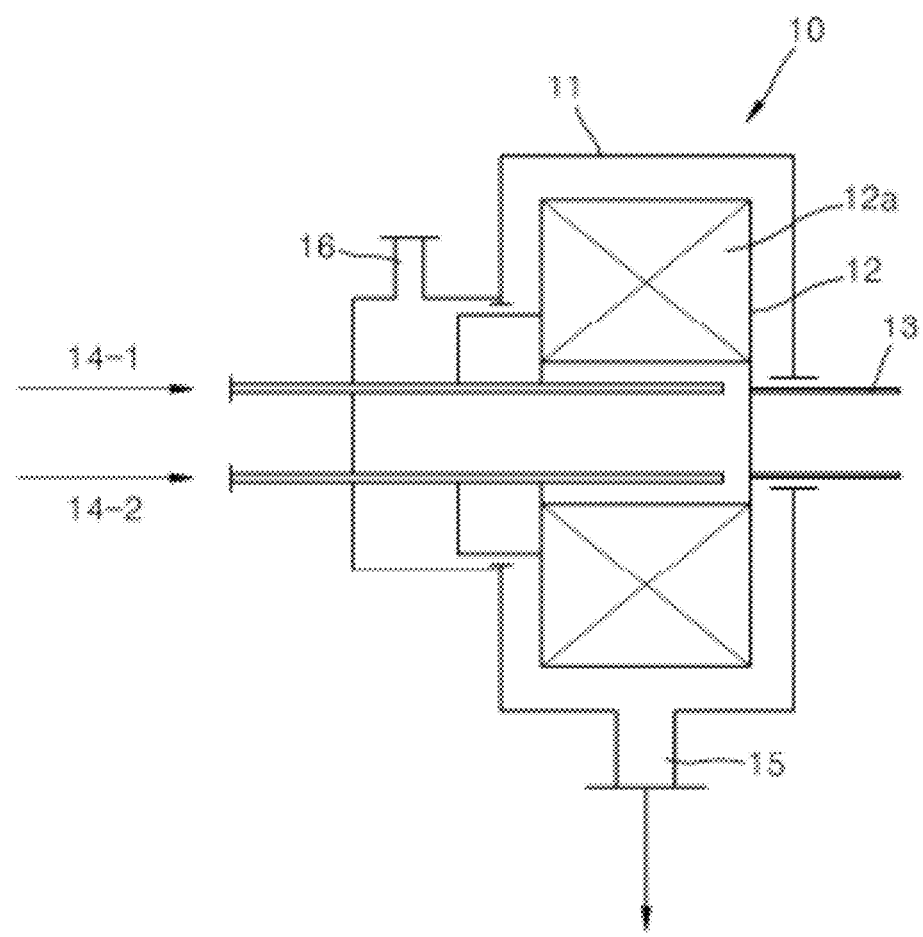
FIG. 1 is a schematic cross-sectional view of a high gravity rotating packed bed reactor that is used in a method of preparing lithium titanate nanoparticles according to an embodiment of the present invention.
Figure 2:
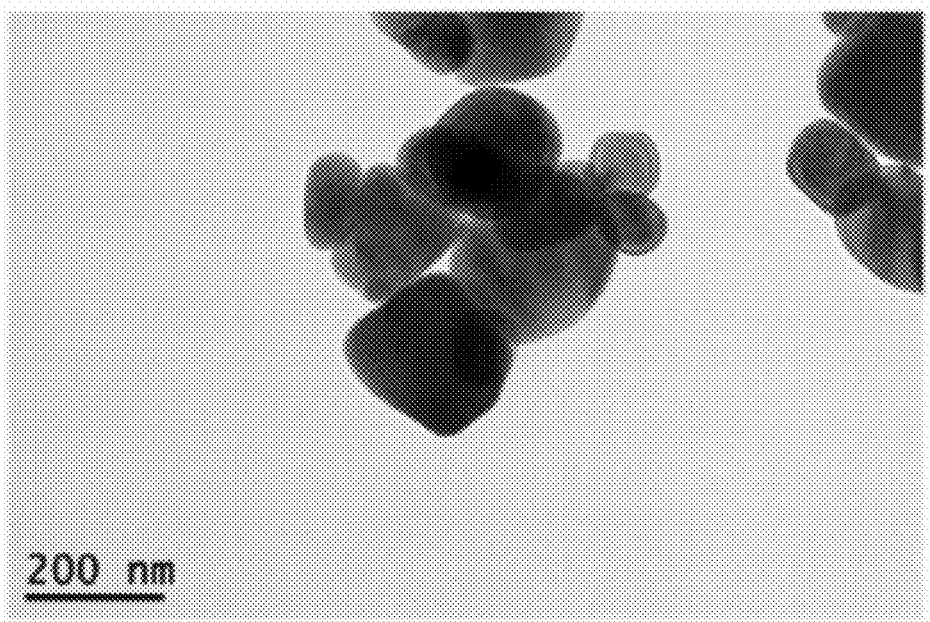
FIG. 2 shows a transmission electron microscope (TEM) image of lithium titanate powders prepared according to Example 1.
Figure 3:
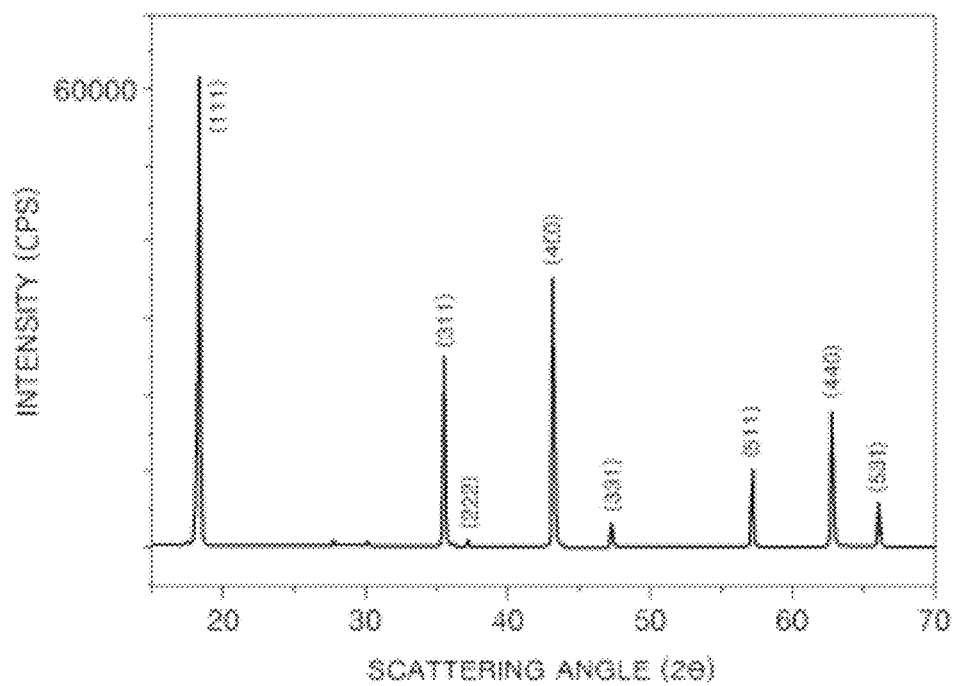
FIG. 3 illustrates an X-ray diffraction pattern of lithium titanate powders prepared according to Example 1.
Figure 4:
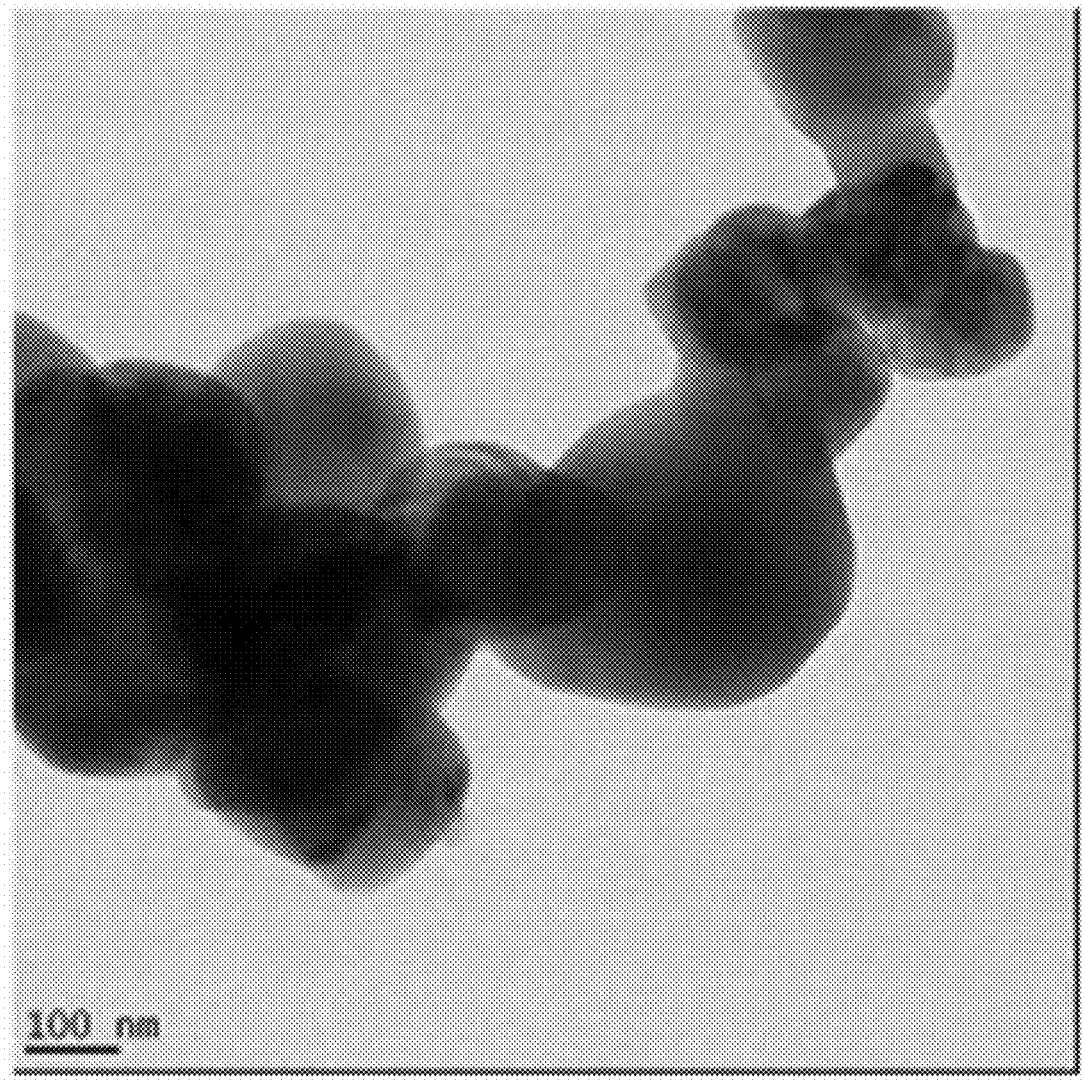
FIG. 4 shows a TEM image of lithium titanate powders prepared according to Example 2.
Figure 5:
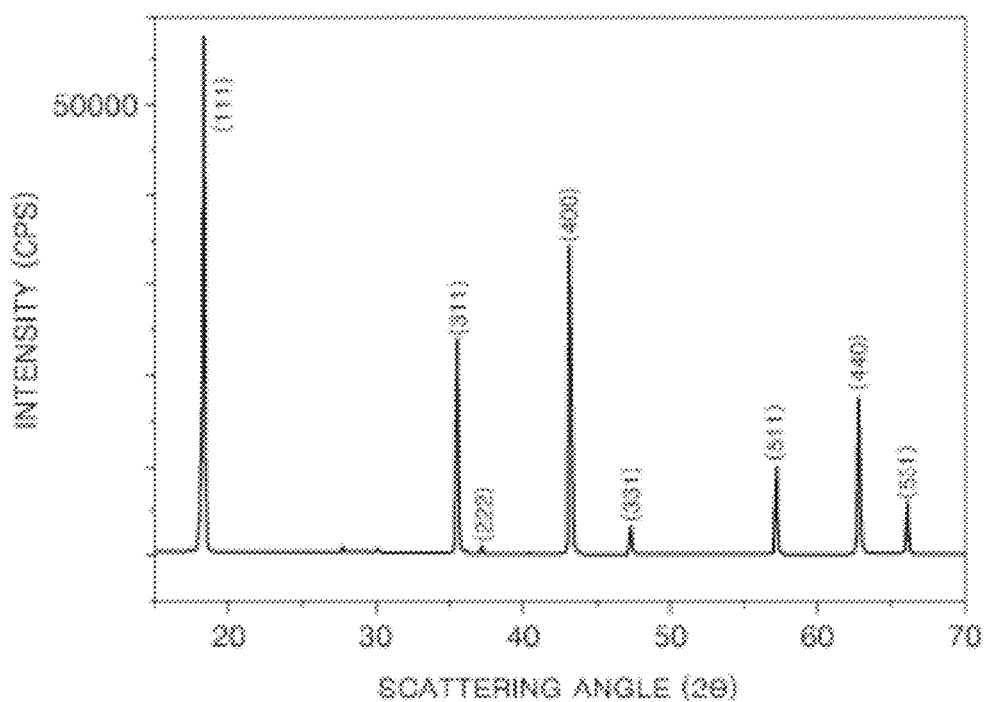
FIG. 5 illustrates an X-ray diffraction pattern of lithium titanate powders prepared according to Example 2.
Figure 6:
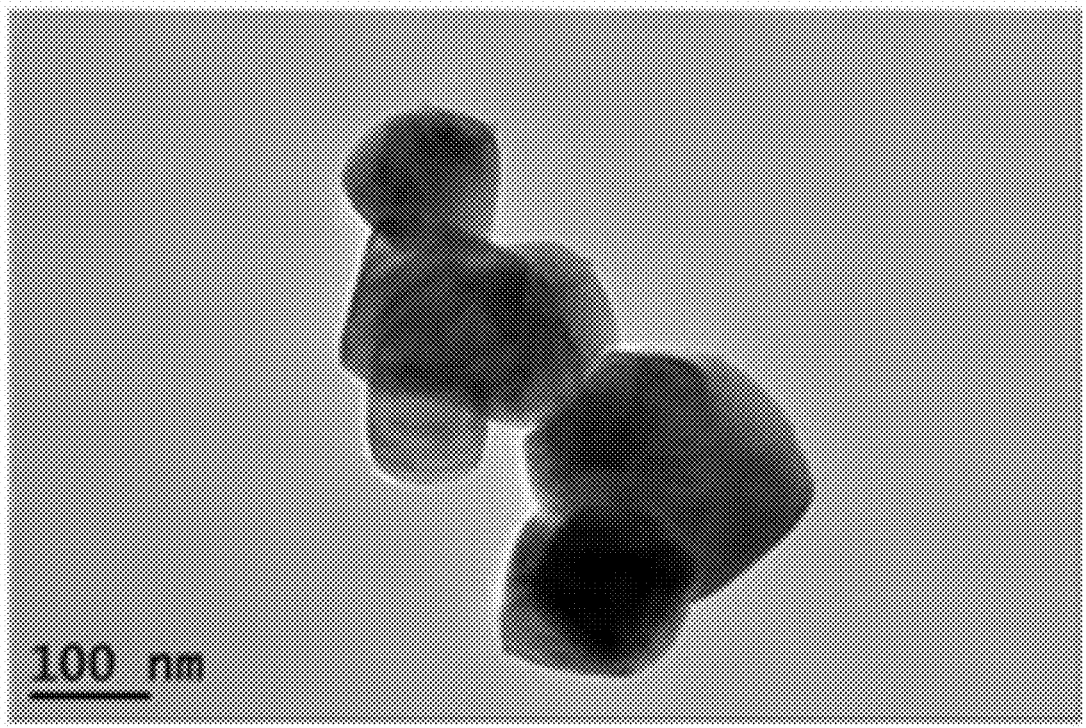
FIG. 6 shows a TEM image of lithium titanate powders prepared according to Example 3.
Figure 7:
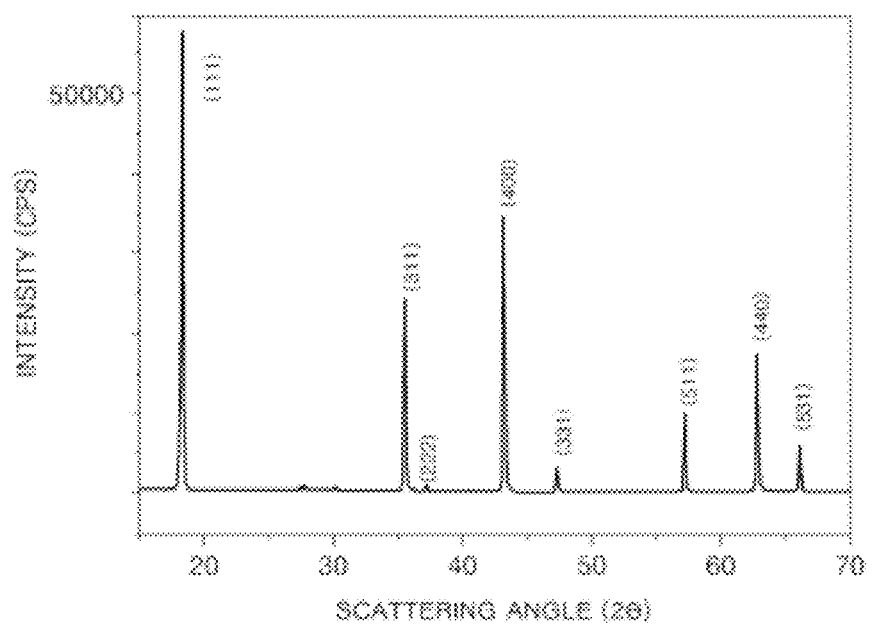
FIG. 7 illustrates an X-ray diffraction pattern of lithium titanate powders prepared according to Example 3.
Figure 8:
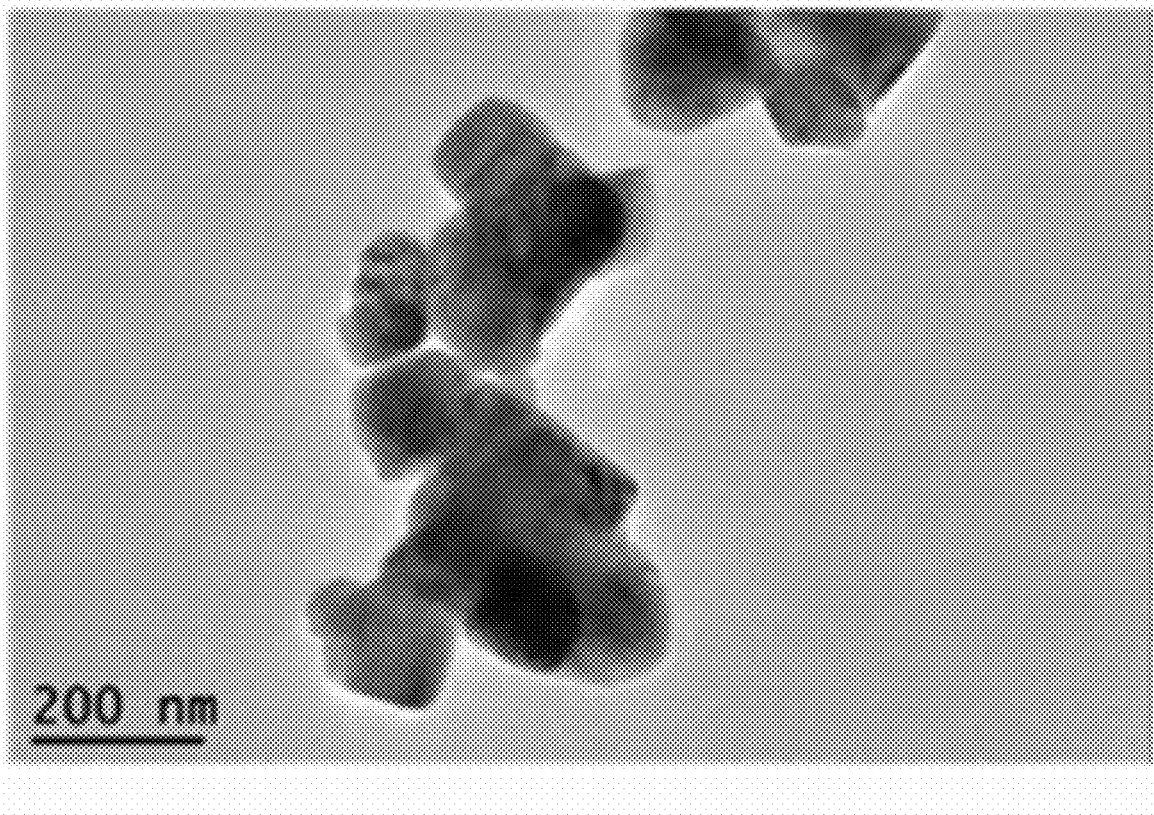
FIG. 8 shows a TEM image of lithium titanate powders prepared according to Example 4.
Figure 9:
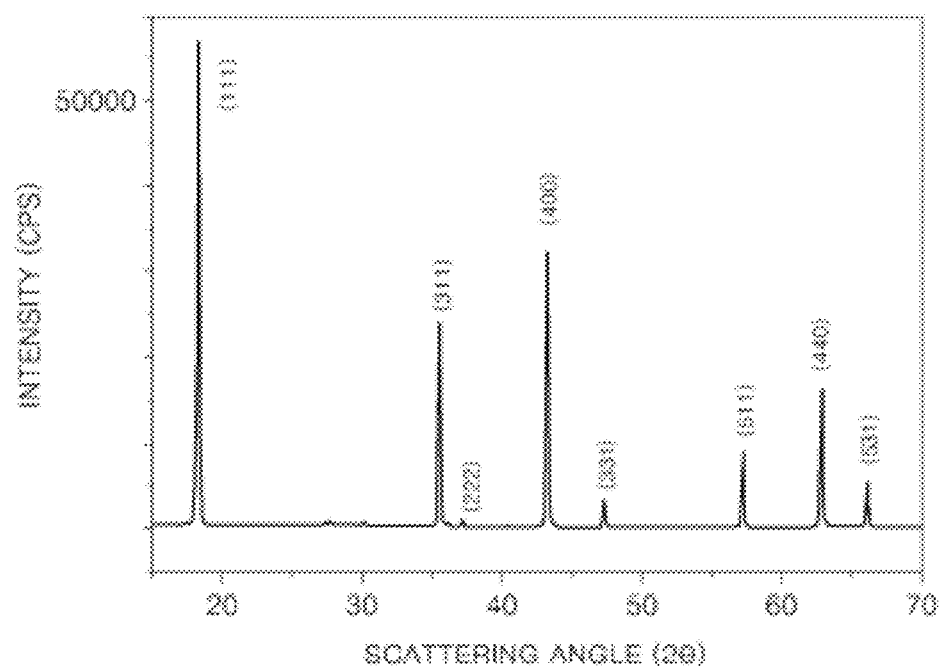
FIG. 9 illustrates an X-ray diffraction pattern of lithium titanate powders prepared according to Example 4.
Figure 10:
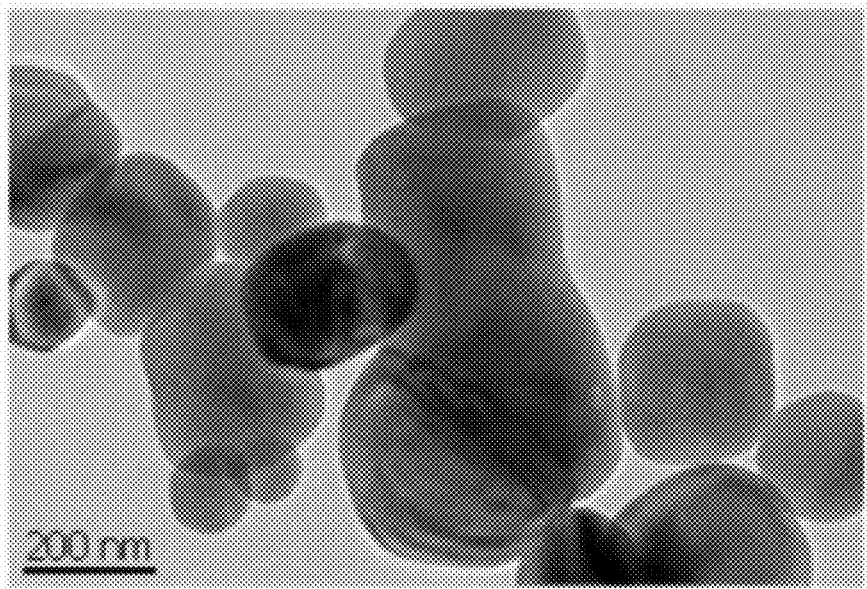
FIG. 10 shows a TEM image of lithium titanate powders prepared according to Comparative Example.
Figure 11:
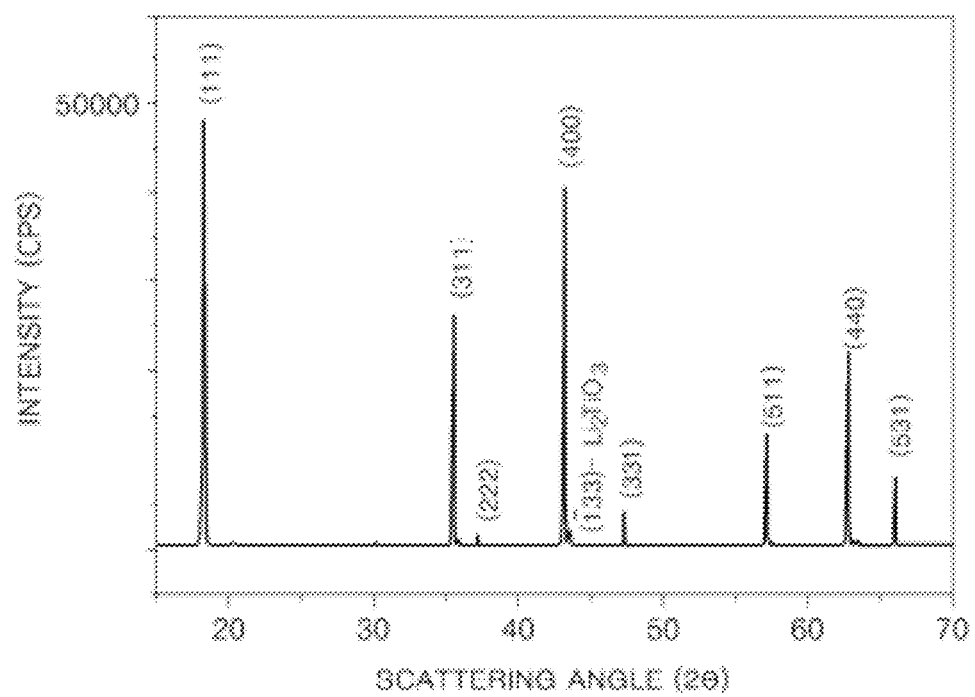
FIG. 11 illustrates an X-ray diffraction pattern of lithium titanate powders prepared according to Comparative Example.

Hereinafter, methods of preparing lithium titanate nanoparticles according to embodiments of the present invention will be described in detail.

A method of preparing lithium titanate nanoparticles according to an embodiment of the present invention includes: feeding reactants including lithium and titanium into a reactor, followed by mixing the reactants in the reactor at a molecular level; and generating a crystal nucleus by chemically reacting the reactants in the reactor, followed by growing the crystal nucleus into a nano-sized crystal. Thereafter, the resultant slurry obtained from the reaction described above is filtered, washed, dried, and/or heated to prepare nano-sized uniform lithium titanate (LTO).

The term 'lithium' used herein refers to a lithium compound, a lithium atom, and/or a lithium ion depending on the context, and the term 'titanium' used herein refers to a titanium compound, a titanium atom, and/or a titanium ion depending on the context.

Also, the term 'mixing at the molecular level' refers to mixing at a level at which the respective molecules are mixed. Typically, 'mixing' can be classified as 'macro-mixing' and 'micro-mixing.' The 'macro-mixing' refers to mixing at a vessel scale, and the 'micro-mixing' refers to mixing at the molecular level.

The reactants may be fed in at least one form of a solution form and a suspension form into the reactor.

The reactants may include an acidic raw material and a basic raw material. In this case, the acidic raw material may be fed into the reactor through a first raw material feeding line and the basic raw material may be fed into the reactor through a second raw material feeding line. After the acidic raw material and the basic raw material are respectively fed into the reactor through the first and second raw material feeding lines, the acidic raw material and the basic raw material are mixed at the molecular level in the reactor and then subjected to a chemical reaction, such as an acid-base reaction, to form LTO nanoparticles.

The acidic raw material may include lithium and titanium. For example, the acidic raw material may include lithium chloride and titanium chloride. The acidic raw material may be, for example, a $LiCl/TiCl_4$ aqueous solution or an aqueous suspension solution. In this case, the basic raw material may include a metal hydroxide, such as NaOH.

Also, the acidic raw material may include titanium and the basic raw material may include lithium. For example, the acidic raw material may include titanium chloride, such as $TiCl_4$, and the basic raw material may include lithium hydroxide, such as LiOH.

Also, the acidic raw material may include lithium and the basic raw material may include titanium. For example, the acidic raw material may include lithium chloride, such as LiCl, and the basic raw material may include titanium hydroxide, such as $Ti(OH)_4$.

Also, the basic raw material may include lithium and titanium. For example, the basic raw material may include lithium hydroxide and titanium hydroxide. The basic raw material may be, for example, a $LiOH/Ti(OH)_4$ aqueous solution or an aqueous suspension solution. In this case, the acidic raw material may include an inorganic acid and/or organic acid, such as HCl or an acetic acid.

The lithium chloride, the titanium chloride, the lithium hydroxide, and the titanium hydroxide are relatively inexpensive and thus contribute to a decrease in costs for preparing lithium titanate nanoparticles.

The chemical reaction may be an acid-base reaction during which one equivalent of an acid is reacted with one equivalent of a base in the reactants and thus the acid and the base in the reactants lose their acidic or basic property.

A time ($T_M$) for the mixing at the molecular level may be shorter than a time ($T_N$) for the generating the crystal nucleus.

The term '$T_M$' used herein refers to a period of time from when the mixing begins to when a composition of the mixture becomes spatially uniform, and the term '$T_N$' used herein refers to a period of time from when the generating the crystal nucleus begins to when the crystal nucleus generation rate reaches an equilibrium, thereby remaining constant.

As described above, by controlling $T_M$ to be shorter than $T_N$, the intermolecular mixing is maximized before the generating the crystal nucleus begins in the reactor. By doing so, nano-sized LTO particles having a uniform particle distribution may be obtained. For example, $T_M$ may be in a range of 10 to 100 μs and $T_N$ may be 1 ms or less. If $T_M$ is less than 10 μs, manufacturing costs may increase, and if $T_M$ is greater than 100 μs, uniformity of particle sizes may decrease. Also, If $T_N$ is greater than 1 ms, an appropriate level of reaction may not occur and thus a product yield may decrease.

In preparing LTO nanoparticles, an inner temperature of the reactor may be in a range of 0 to 90□, for example, 20 to 80□. If the inner temperature is lower than 0□, an appropriate level of product yield may not be obtained. If the inner temperature is higher than 90□, $T_N$ may not be controllable. Also, a molar ratio of lithium to titanium (Li/Ti) among the reactants may be in a range of 0.8 to 1.0. If the molar ratio (Li/Ti) is less than 0.8, a Ti-rich crystal may be formed as a by-product, and if the molar ratio (Li/Ti) is greater than 1.0, a Li-rich crystal may be formed as a by-product.

A retention time of the reactants in the reactor may be in a range of 1 ms to 10 s, for example, 10 ms to 5 s. If the retention time of the reactants is less than 1 ms, an appropriate level of reaction may not occur, and if the retention time of the reactants is greater than 10 s, it is difficult to control a particle size and manufacturing costs may increase.

FIG. 1 is a schematic cross-sectional view of a high gravity rotating packed bed reactor 10 that is used in a method of preparing lithium titanate nanoparticles according to an embodiment of the present invention.

The high gravity rotating packed bed reactor 10 may include a chamber 11 that defines an inner space, a permeable packed bed 12 that is rotatable, is disposed inside the chamber 10, and is filled with a porous filler 12a, at least one raw material feeding line through which the reactants are fed into the inner space, and a slurry outlet 15 through which a slurry is discharged from the inner space.

Also, the reactor 10 may further include a gas outlet 16 for discharging a gas from the inner space.

The porous filler 12a may include titanium, which is a strong corrosion-resistant material. For example, the porous filler 12a may be a titanium foam.

The permeable packed bed 12 may be filled with the porous filler 12a therein and may allow the reactants fed in a solution or suspension form into the reactor 10 to permeate therethrough, and may be rotatable by a driving axis 13. A centrifugal acceleration of the permeable packed bed 12 may be maintained in a range of 10 to 100,000 m/s². If the centrifugal acceleration of the permeable packed bed 12 is less than 10 m/s², an appropriate level of reaction may not occur. Meanwhile, typically, the centrifugal acceleration of the permeable packed bed 12 cannot exceed 100,000 m/s$^2$.

Although the reactor 10 having such a structure operates in an atmospheric condition, because the reactants can be mixed at the molecular level by a high centrifugal force by controlling the rotational speed of the permeable packed bed 12, the reaction may be smoothly performed even at low temperature. That is, because micro droplets of the reactants are well mixed before LTO particles grow, uniform LTO nanoparticles may be obtained even at low temperature.

LTO prepared by using a method of preparing lithium titanate nanoparticles according to an embodiment of the present invention may have a spinel structure, and an average particle size thereof may be in a range of 0.01 to 10 μm, for example, 0.05 to 0.8 μm. Also, a height ratio of $Li_2TiO_3$ peak at 2θ of 43 to 44 corresponding to a (133) plane to a $Li_4Ti_5O_{12}$ peak corresponding to a (400) plane in an X-ray diffraction (XRD) pattern, is 0.5/100 or less (a measurement limit of XRD equipment). Thus, it is possible to manufacture high-purity lithium titanate that substantially does not have the $Li_2TiO_3$ peak. Accordingly, the obtained lithium titanate nanoparticles may be used as an anode material for a lithium secondary battery.

Hereinafter, embodiments of the present invention will be described in detail. However, the present invention is not limited to the examples

EXAMPLE

Example 1

(1) 6.0 mol/L of a NaOH aqueous solution was prepared.

(2) 2.0 mol/L of a LiCl aqueous solution and 2.0 mol/L of a $TiCl_4$ aqueous solution were separately prepared and then the two metal chloride aqueous solutions were mixed. In the mixed solution, a molar ratio of Li to Ti (Li/Ti) was 0.8.

(3) The reactor 10 of FIG. 1 was manufactured by the inventors of the present invention. The reactor 10 has the following specification.

permeable packed bed 12: a cylinder formed of stainless steel and having an inner diameter of 10 cm, an outer diameter of 30 cm, and a thickness of 10 cm porous filler 12a: 4 sheets of titanium foam (about 400 pores/m, an outer diameter of 30 cm, an inner diameter of 10.5 cm, and an axis-direction thickness of 2.5 cm)

(4) To prepare LTO nanoparticles, the driving axis 13 of the reactor 10 was rotated to make the permeable packed bed 12 rotate at a rotational speed of 3000 rpm (centrifugal acceleration: 10,000 m/s$^2$) while the inner temperature of the reactor 10 was maintained at a temperature of 80° C.

(5) the NaOH aqueous solution prepared in step (1) and the LiCl/TiCl$_4$ mixed solution prepared in step (2) were continuously fed into the reactor 10 through the first raw material feeding line 14-1 and second raw material feeding line 14-2, respectively, at a flow rate of 40 L/min to prepare LTO nanoparticles.

(6) A slurry including the LTO nanoparticles was discharged through the slurry outlet 15.

(7) The slurry was filtered and washed with water and dried in a drying device at a temperature of 120° C. to obtain LTO powder.

Example 2

(1) 2.0 mol/L of a LiOH aqueous solution was prepared.
(2) 2.0 mol/L of a $TiCl_4$ aqueous solution was prepared.

(3) To prepare LTO nanoparticles, the driving axis 13 of the reactor 10 manufactured according to Example 1 was rotated to make the permeable packed bed 12 rotate at a rotational speed of 3000 rpm (centrifugal acceleration: 10,000 m/s$^2$) while the inner temperature of the reactor 10 was maintained at a temperature of 90° C.

(4) the LiOH aqueous solution prepared in step (1) and the $TiCl_4$ aqueous solution prepared in step (2) were continuously fed into the reactor 10 through the first raw material feeding line 14-1 and second raw material feeding line 14-2, respectively, at a flow rate of 40 L/min to prepare LTO nanoparticles. In this case, a molar ratio (Li/Ti) of Li of the LiOH aqueous solution to Ti of the $TiCl_4$ aqueous solution was 1.0.

(5) A slurry including the LTO nanoparticles was discharged through the slurry outlet 15.

(6) The slurry was filtered and washed with water and dried in a drying device at a temperature of 120° C. to obtain LTO powder.

Example 3

LTO nanoparticles were prepared in the same manner as in Example 2, except that after 2.0 mol/L of a LiCl aqueous solution and 2.0 mol/L of a $Ti(OH)_4$ aqueous solution were separately prepared, and the respective aqueous solutions were continuously fed into the reactor 10 through the first raw material feeding line 14-1 and the second raw material feeding line 14-2 at a flow rate of 40 L/min. Then, the LTO nanoparticles were filtered, washed, and dried to prepare LTO powder.

Example 4

6.0 mol/L of a HCl aqueous solution, 2.0 mol/L of a LiOH aqueous solution, and 2.0 mol/L of a $Ti(OH)_4$ aqueous solution were separately prepared, and then the LiOH aqueous solution was mixed with the $Ti(OH)_4$ aqueous solution. In the mixed solution, a molar ratio of Li to Ti (Li/Ti) was 1.0. Thereafter, the same method as in Example 1 was used to prepare LTO nanoparticles, except that the HCl aqueous solution and the LiOH/Ti(OH)$_4$ mixed solution were continuously fed into the reactor 10 through the first raw material feeding line 14-1 and the second raw material feeding line 14-2, respectively, at a flow rate of 40 L/min. Then, the LTO nanoparticles were filtered, washed, dried, and heated at a temperature of 850□ for 3 hours, thereby completing the preparation of LTO powder.

Comparative Example 2 mol of $Li_2CO_3$ and 5 mol of $TiO_2$ were added to 10 mol of water, and the mixture was kneaded using a ball mill for 24 hours. Then, the mixture was dried in a drying oven at a temperature of 120□ and heated at a temperature of 950□ for 3 hours, thereby completing the preparation of LTO powder.

Analysis Example

Transmission electron microscope (TEM) images and X-ray diffraction (XRD) patterns of the lithium titanate nanoparticles prepared according to Examples 1-4 and Comparative Example are shown in FIGS. 2-11. Specifications and analysis conditions of TEM and XRD are shown in Table 1 below:

TABLE 1

|  |  | TEM | XRD |
| --- | --- | --- | --- |
| Specification | Manufacturer | JEOL | Rikagu |
|  | Model name | 2100F | D/Max-2500VK/PC |
| Analysis conditions |  | 200 kV | CuKa radiation, speed 4° min$^{-1}$ |

Referring to FIGS. 2-11, when a method of preparing lithium titanate nanoparticles according to an embodiment of the present invention was used, compared to Comparative Example, LTO particles having a relatively uniform particle size distribution and nano-sizes were obtained although relatively low-price reactants were used. For example, from FIGS. 2, 4, 6 and 8, it was confirmed that the particles prepared according to Examples 1-4 have nano-sizes and uniform particle size distributions. Also, from FIGS. 3, 5, 7 and 9, it was confirmed that the obtained particles are LTO ($Li_4Ti_5O_{12}$). In comparison of a height of the $Li_2TiO_3$ peak at 2θ of 43 to 44 corresponding to a (133) plane with a height of the $Li_4Ti_5O_{12}$ peak corresponding to a (400) plane in the XRD patterns of the LTO nano particles prepared according to embodiments of the present invention shown in FIGS. 3, 5, 7 and 9 in view of the fact that a height ratio of the $Li_2TiO_3$ peak corresponding to a (133) plane to the $Li_4Ti_5O_{12}$ peak corresponding to a (400) plane in the XRD pattern (FIG. 11) of LTO particles prepared according to Comparative Example was 4.48/100, it was confirmed that a method of preparing lithium titanate nanoparticles according to an embodiment of the present invention enables preparation of high-purity lithium titanate that has substantially no trace of the $Li_2TiO_3$ peak. For reference, the respective numerals (for example, 200 nm of FIG. 2) shown in the images of FIGS. 2, 4, 6, 8 and 10 indicate lengths of bold bars in the respective images, and the respective numerals (for example, (111) of FIG. 3) shown in the graphs of FIGS. 3, 5, 7, 9 and 11 indicate facial indices.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of preparing lithium titanate nanoparticles, the method comprising:
feeding reactants comprising lithium and titanium into a reactor, followed by mixing the reactants in the reactor at a molecular level; and
generating a crystal nucleus by chemically reacting the reactants in the reactor, wherein the reactor is a high gravity rotating packed bed reactor comprising:
a chamber that defines an inner space;
a permeable packed bed that is rotatable, is disposed inside the chamber, and is filled with a porous filler;
at least one raw material feeding line through which the reactants are fed into the inner space; and
a slurry outlet through which a slurry is discharged from the inner space.

2. The method of claim 1, wherein the chemical reaction is an acid-base reaction.

3. The method of claim 1, wherein the reactants are fed in at least one of a solution form and a suspension form into the reactor.

4. The method of claim 3, wherein the reactants comprise an acidic raw material and a basic raw material, wherein the acidic raw material is fed into the reactor through a first raw material feeding line and the basic raw material is fed into the reactor through a second raw material feeding line.

5. The method of claim 4, wherein the acidic raw material comprises lithium and titanium, and the basic raw material comprises metal hydroxide.

6. The method of claim 4, wherein the acidic raw material comprises titanium, and the basic raw material comprises lithium.

7. The method of claim 4, wherein the acidic raw material comprises lithium, and the basic raw material comprises titanium.

8. The method of claim 4, wherein the basic raw material comprises lithium and titanium, and the acidic raw material comprises at least one selected from the group consisting of inorganic acids and organic acids.

9. The method of claim 1, wherein a time ($T_M$) for the mixing at the molecular level is shorter than a time ($T_N$) for the generating the crystal nucleus.

10. The method of claim 9, wherein $T_M$ is in a range of 10 to 100 μs and $T_N$ is 1 ms or less.

11. The method of claim 1, wherein an inner temperature of the reactor is maintained in a range of 0 to 90° C.

12. The method of claim 1, wherein a molar ratio of lithium to titanium (Li/Ti) among the reactants is in a range of 0.8 to 1.0.

13. The method of claim 1, wherein a retention time of the reactants in the reactor is in a range of 1 ms to 10 s.

14. The method of claim 1, wherein a centrifugal acceleration of the permeable packed bed is in a range of 10 to 100,000 m/s$^2$.

15. The method of claim 1, wherein a $Li_2TiO_3$ peak is not present in an X-ray diffraction pattern of lithium titanate.

* * * * *